Sept. 28, 1954  M. A. ERICKSON ET AL  2,690,045
SIDE DELIVERY RAKE
Filed Sept. 18, 1952  3 Sheets-Sheet 2
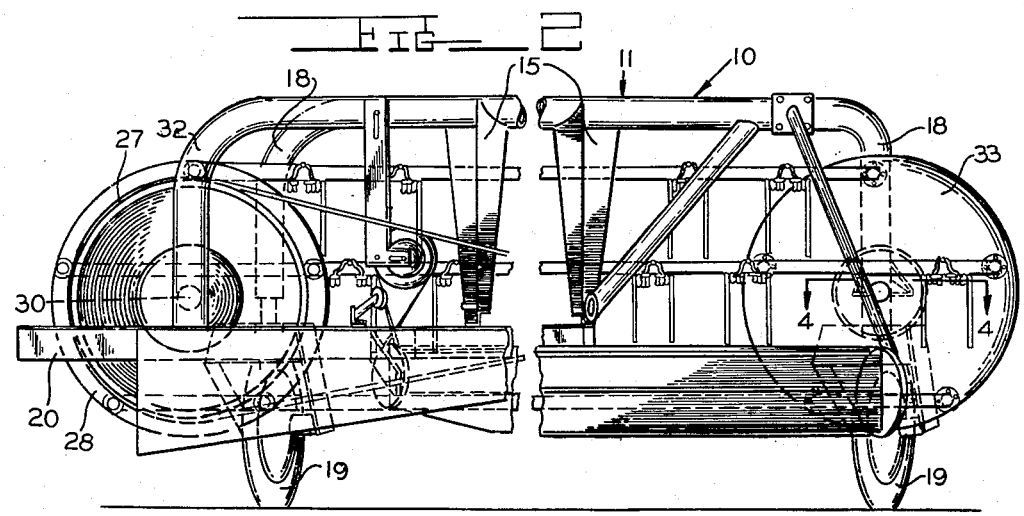
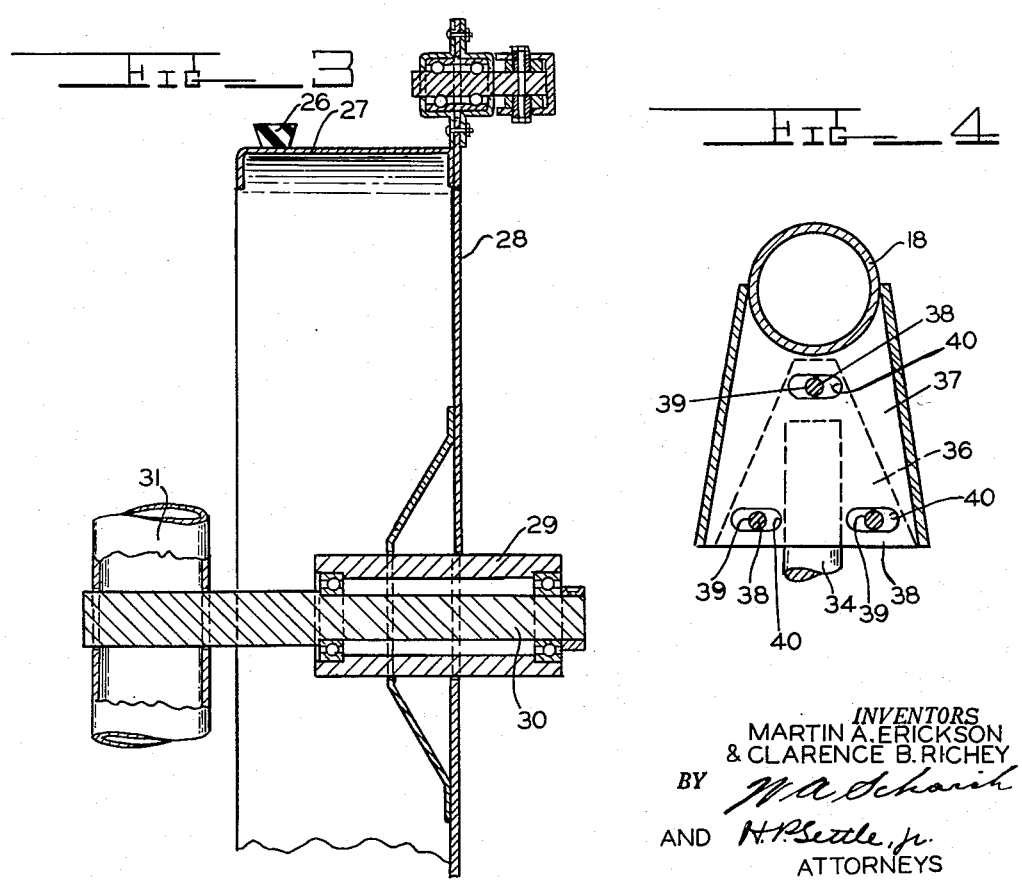
INVENTORS
MARTIN A. ERICKSON
& CLARENCE B. RICHEY
BY
AND
ATTORNEYS Patented Sept. 28, 1954

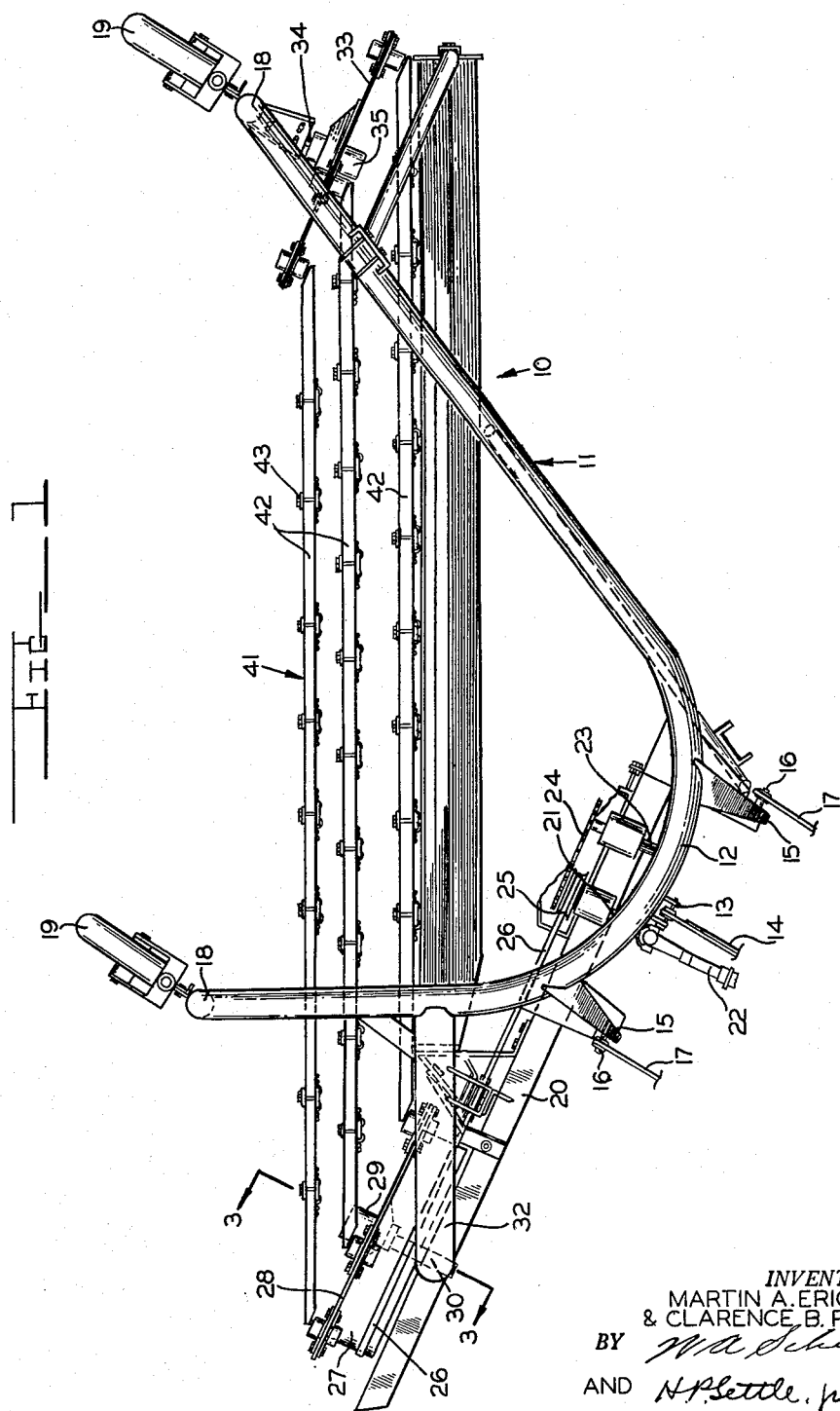

2,690,045

UNITED STATES PATENT OFFICE 2,690,045

SIDE DELIVERY RAKE

Martin A. Erickson, Detroit, and Clarence B. Richey, Royal Oak, Mich., assignors, by mesne assignments, to Ford Motor Company, Dearborn, Mich., a corporation of Delaware Application September 18, 1952, Serial No. 310,276

1 Claim. (Cl. 56—377)

The present invention relaes to a side delivery rake and more particularly to a rake of the side delivery type having an improved raking reel operable at relatively high raking speeds.

In the conventional side delivery rake, the raking reel is defined by a pair of laterally and longitudinally spaced spiders or end plates to which are attached a plurality of rake tooth bars extending therebetween. The tooth bars are provided generally with terminal fixed bearing spindles deflected from the axes of the tooth bars and received by bearings rigidly secured to the end members. Since the bearing elements are rigidly confined between the tooth bars and the end members, any misalignment of the rake frame will prevent exact parallelism of the end plates, and the cylindroidal raking reel will be off center causing the generation of severe stresses in the reel, and particularly in the tooth bars, and the tooth bar bearings during reel rotation at relatively high speeds. Further, the tooth bars are spaced peripherally of the end plates and, during reel rotation, the bars deflect or bow due to centrifugal force, acting thereon, and also due to the drag exerted on the teeth by the ground and/or the material being raked. This tooth bar deflection causes relative misalignment of the bearing spindles and the end plate bearings, and bearing failure has occurred under severe operating conditions.

The present invention now provides an improved raking reel, which, by eliminating the common factors of rake failure heretofore described, is operable at high raking speeds. More particularly, the reel end plates are mounted upon spindles which are relatively movable angularly with respect to one another, so that the spindles and the end plates carried thereby may be adjusted to exact parallelism during reel assembly. Further, the rake tooth bar bearing shafts are pivotally connected to the tooth bars, so that there is no rigid tooth bar-end plate connection. This pivotal connection of the rake tooth bar bearing shafts to the tooth bars prevents misalignment of the bearing shafts with the tooth bar bearings carried by the end plates due to deflection of the tooth bars, and the only possible misalignment of the bearing shafts within the bearings is that slight misalignment caused by the very small change in effective length of the tooth bars during such bar deflection.

It is, therefore, an important object of the present invention to provide an improved side delivery rake having a novel type raking reel operable under severe operating conditions, Another important object is the provision of a side delivery rake reel in which the reel end plates are adjusted into parallelism during assembly, and in which there is no rigid tooth bar-end plate connection, to eliminate the common causes of tooth bar bearing failure.

A further object of this invention is the provision of an improved side delivery rake having tooth bars provided with terminal relatively pivotable bearing shafts received by bearings carried by the reel end plates, the pivoted shafts accommodating tooth bar deflection generated during rake operation.

Still another object of the present invention is the provision of a side delivery rake having a cylindroidal raking reel defined by end plates relatively movable during assembly into exact parallelism and having tooth bars journaled by the end plates through pivoted bearing connections.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a plan view of a side delivery rake of the present invention;

Figure 2 is a front elevational view of the rake of Figure 1;

Figure 3 is a greatly enlarged sectional view taken along the plane 3—3 of Figure 1, with parts broken away;

Figure 4 is an enlarged sectional view taken along the plane 4—4 of Figure 2;

As shown on the drawings:

Figure 5:
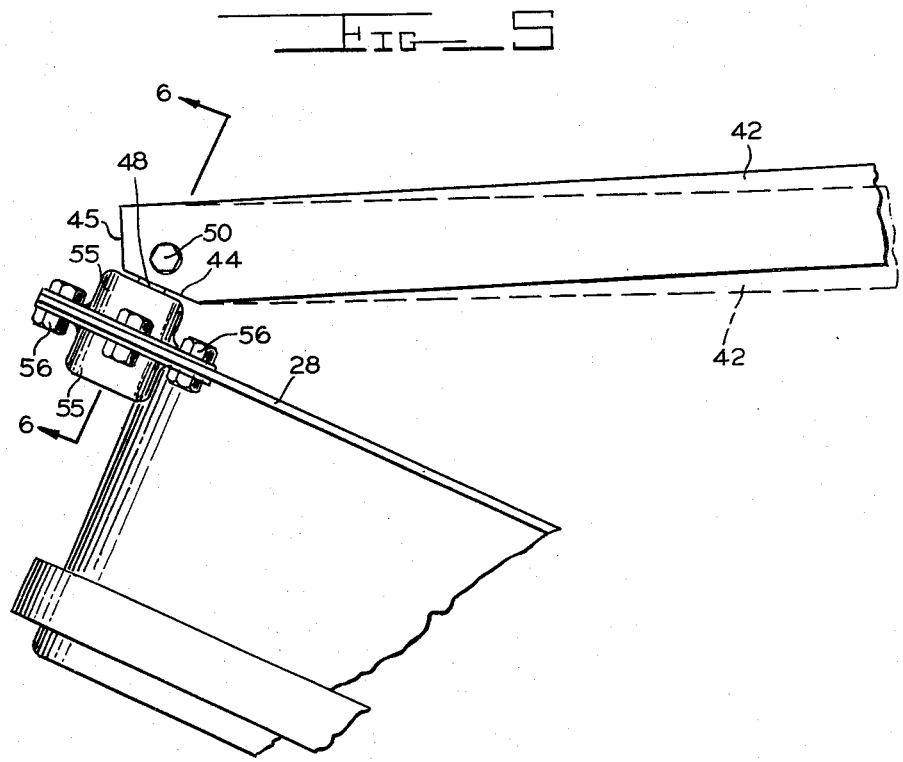
Figure 5 is a greatly enlarged elevational view of an end plate and one tooth bar of the illustrated rake, showing the accommodation of centrifugal tooth bar deflection by the pivoted bearing connection of the tooth bar and the end plate.

In Figure 1 reference numeral 10 refers generally to a side delivery rake of the present invention. The illustrated rake is generally similar to that disclosed in the pending application of Clarence B. Richey, Serial No. 136,305, filed December 31, 1949, now United States Patent No. 2,641,895, and assigned to the assignee of the present invention. The rake 10 generally comprises a U-shaped main frame 11 having a central forward bight portion 12 provided with a clevis 13 attachable to the top link 14 of a tractor and also having depending plates 15 carrying laterally directed attachment pins 16 adapted for connection to the draft links 17 of the tractor. The rear trailing ends of the U-shaped frame 11 are downturned, as at 18, to provide posts for mounting trailing, ground-engaging caster wheels 19.

The frame 11 also carries a laterally extending beam 20 projecting laterally outwardly of the frame at the leading portions thereof to support a rake driving mechanism including a shaft 21 adapted to be coupled to the power extension 22 of the tractor. Actually, the drive mechanism preferably includes the shaft 21 and a second driving shaft 23, either of which may be coupled to the extension 22, and which are adapted to correlate the rotatable speed of the rake reel (to be hereinafter described) with the ground speed of the tractor even though the rotatable speed of the power-take-off extension 22 varies when the tractor is operating in different gear speed ratios. The shafts 21 and 23 are interconnected by a sprocket chain 24 lapping sprockets of different size so that either shaft may be utilized to drive a sheave 25 lapped by a V-belt 26.

The belt 26, as best shown in Figures 2 and 3, laps an axially extending flange 27 rigidly secured to a forward reel end plate 28 journaled by a bearing 29 upon a spindle 30 carried by the terminal downturned leg 31 of a lateral frame extension 32. The end plate 28 defines one end of a cylindroidal raking reel 41, and the other end of the reel is defined by a second end plate 33 having a centrally located spindle 34 journaled by a bearing 35 centrally located on the end plate 33. The spindle 34 (Figure 4) is rigidly secured to a generally triangular plate 36 underlying a second similar plate 37. The plate 37 is rigidly secured, as by welding or the like, to the trailing leg 18 of the frame 11 above the caster wheel 19 associated therewith. The plates 36 and 37 are secured together by suitable means, as by bolts 38, passing through circular apertures 39 in the lower plate 36 and laterally extending slots 40 formed at the upper plate 37.

It will be appreciated that the spindle 34 may be angularly and laterally adjusted relative to the spindle 30 of the forward plate 28 by loosening the bolts 38 and sliding the same within the slots 40. This adjustment of the plates is provided to insure accurate parallelism between the end plates, so that an accurately running reel is provided despite minor variations in the rake frame 11.

Figure 6:
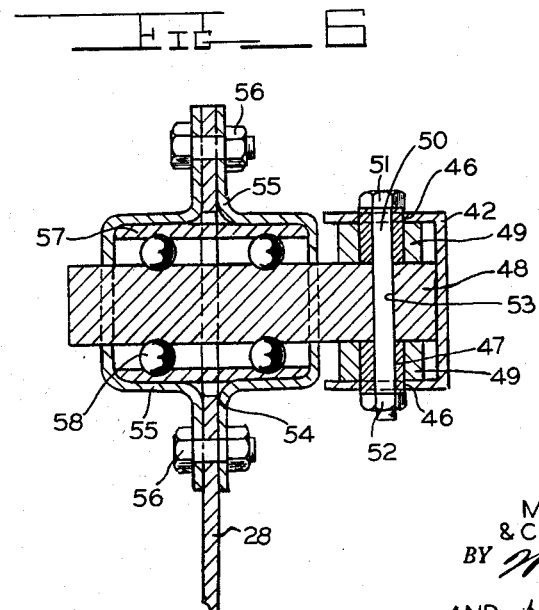
Figure 6 is a greatly enlarged sectional view, with parts shown in elevation, taken along the plane 6—6 of Figure 5.

The raking reel itself is indicated generally by reference numeral 41 and the reel periphery is defined by a plurity of rake tooth bars 42 extending between and joining the end plates 28 and 33. As best illustrated in Figures 3 and 6, the hollow tooth bars 42 are of polygonal, preferably rectangular, cross-sectional configuration and carry a plurality of rake teeth 43 clamped thereon.

Also, as best illustrated in Figure 5, the tooth bars are provided with a chamfered corner 44 adjacent each terminal end 45 thereof, the chamfered corner 44 of the tooth bar lying substantially parallel to the associated end plate 28 or 33. Immediately adjacent the chamfered corners 44, each tooth bar is provided with a pair of normally vertically aligned apertures 46 within which are positioned cylindrical bushings 47 projecting slightly beyond the tooth bar exterior surfaces of their outer ends, and, at their inner ends, the bushings a transversely extending bearing shaft 48 projecting through the open walls of the tooth bar provided by the chamfered corner 44. To accurately position the bearing shaft 48 centrally of the tooth bars, a rectangular block 49 is press-fitted on the free end of the bearing shaft 48 to contact the inner opposing surfaces of the tooth bar 42.

The shaft 48, the block 49, and the bushings 47 are retained within each end of the tooth bars by a bolt 50 extending transversely of the tooth bar and having an enlarged head 51 and a nut 52 contacting the opposed ends of the bushings 47. The bearing shafts 48 are apertured, as at 53, to receive the bolts 50 therein. It will be appreciated that the bearing shafts 48 are pivotal about the pivot axes defined by the bolts 15 for a purpose to be hereinafter described.

The bearing shafts 48 project laterally from the associated tooth bar toward and through the associated end plate 28 or 33, the end plates being apertured, as at 54, to receive the shafts therethrough. The shafts are journaled by suitable bearings carried by the end plates, such as the illustrated bearings comprising opposingly dished cups 55 secured to opposing faces of the plates 28 and 33 by suitable means, as by bolts 56, to surround the plate apertures 54. The bearing cups cooperably confine an outer bearing race 57 of cylindrical contour extending through the plate apertures 54 and confining antifriction elements, such as ball bearings 58, against the bearing shafts 48. Each shaft 48 thus defines the inner race of the associated bearing and the spindle is supported for rotation relative to the plates 28 or 33 by the antifriction elements 58.

The utility of the bearing assembly illustrated in Figure 6 will be appreciated from a study of Figure 5 of the drawings. In Figure 5, the normal or at rest position of the tooth bar 42 is illustrated in dotted outline, while the position assumed by the tooth bar 42 during operation of the rake is illustrated in full outline. The full line position of the tooth bar is somewhat exaggerated in order to better illustrate the operation of the bearing. During rotation of the reel at high raking speeds, the peripheral speed of the rake must be correlated with the ground speed of the rake and the tractor. In such high speeds, the tooth bars, because of their unsupported lengths intermediate the end plates 28 and 33, will be bowed by the centrifugal forces exerted thereon because of reel rotation, and also because of the drag of the teeth 43 upon the material being raked and upon the ground. It will be appreciated that the bowing of the tooth bars for either of these reasons would cause severe misalignment of the bearing shafts 48 within the bearings 55 carried by the end plates if the conventional rigid shaft-tooth bar connection were utilized. However, in the present invention, the relative movement of the bars and the end plates is accommodated by pivoted movement of the bearing spindles about the pivot axis defined by the bolt 50. Free pivoting movement is assured by the bushings 47 which have a length slightly in excess of the axial length of the block 49 plus the wall thickness of the tooth bars 42.

Because of the freedom of pivoting movement of the tooth bars relative to the end plates, the only crimping or misalignment of the bearing spindles within the bearings is due to the very slight shortening in length of the distance between the end plates 28 and 33 upon tooth bar deflection. It will be appreciated that this change in length is very slight, inasmuch as the bowing of the tooth bars occurs as an arc about a very large radius, and the actual distance between the end plates is shortened to the length of a chord of this arc. In any event, the misalignment due to the change in effective tooth bar length is much less than that which otherwise would be caused by tooth bar deflection.

If one of the end plates 28 or 33 should be relatively longitudinally and/or laterally displaced because of manufacturing variations in the frame, etc. the assembly of the reel upon the frame is accommodated by relative movement of the plates in combination with pivoted movement of the tooth bars relative to the bar bearing shafts. More particularly, the pivoted tooth-bearing construction accommodates a change in angle of the tooth bars relative to the end plates when such is necessary without generating substantial stress in the constant length tooth bars or in the tooth bar bearings.

It will thus be seen that the invention provides an improved side delivery rake in which the rake reel end plates are always parallel and in which a pivoted tooth bar-bearing shaft construction is utilized to obviate tooth bar-bearing misalignment under severe operating conditions.

It will, of course, be understood that various details of construction may be varied through a wide range without departing from the principles of this invention and it is, therefore, not the purpose to limit the patent granted hereon otherwise than necessitated by the scope of the appended claim.

We claim:

In a side delivery rake, a rake frame, and a raking reel carried by said frame comprising a generally rearwardly directed front spindle secured to said frame against relative movement, a front reel end element, bearing means journaling said front element on said front spindle, a generally forwardly projecting fixed attachment plate rigidly secured to said frame adjacent the rear end thereof and having lateral slots therein, a movable attachment plate in flatwise contact with said fixed plate and having apertures therein registering with said fixed plate slots, clamping means projecting through said attachment plate slots and apertures for adjustably securing said plates to each other, a rear spindle carried by said movable attachment plate, a rear reel end element, bearing means journaling said rear end element of said rear spindle, and a plurality of tooth bars of equal length joining said end elements to define the raking reel periphery, whereby said end elements are adjustable into exact parallelism by movement of the rear spindle by means of said relatively movable attachment plates.

References Cited in the file of this patent

UNITED STATES PATENTS

| Number | Name | Date |
|---|---|---|
| 935,456 | Blackstone et al. | Sept. 28, 1909 |
| 960,950 | Keeser | June 7, 1910 |
| 2,040,692 | Hitchcock | May 12, 1936 |
| 2,573,971 | Hoefer | Nov. 6, 1951 |